United States Patent
Decker et al.

(10) Patent No.: US 6,338,609 B1
(45) Date of Patent: Jan. 15, 2002

(54) CONVEX COMPRESSOR CASING

(75) Inventors: John J. Decker, Liberty Township; Andrew Breeze-Stringfellow, Montgomery, both of OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/507,409

(22) Filed: Feb. 18, 2000

(51) Int. Cl.[7] .................................................. F01D 5/20
(52) U.S. Cl. ..................... 415/173.1; 415/221; 415/222; 416/228; 416/242; 416/243; 416/223 A
(58) Field of Search .............................. 415/173.1, 220, 415/221, 222; 416/228, 242, 243, 223 R, 223 A

(56) References Cited

U.S. PATENT DOCUMENTS

| | | | | |
|---|---|---|---|---|
| 2,788,172 A | * | 4/1957 | Stalker | 415/220 |
| 2,830,753 A | * | 4/1958 | Stalker | 415/222 |
| 3,173,605 A | * | 3/1965 | Harris | 415/207 |
| 3,851,994 A | * | 12/1974 | Seippel | 416/223 |
| 4,213,736 A | * | 7/1980 | Gongwer | 415/182 |
| 4,726,737 A | | 2/1988 | Weingold et al. | |
| 5,167,489 A | | 12/1992 | Wadia et al. | |
| 5,385,447 A | * | 1/1995 | Geister | 415/220 |
| 5,513,952 A | * | 5/1996 | Mizuta et al. | 415/182.1 |
| 5,642,985 A | | 7/1997 | Spear et al. | |
| 5,735,673 A | | 4/1998 | Matheny et al. | |

FOREIGN PATENT DOCUMENTS

EP 0801230 A2 10/1997

* cited by examiner

Primary Examiner—Edward K. Look
Assistant Examiner—Ninh Nguyen
(74) Attorney, Agent, or Firm—Andrew C. Hess; Nathan D. Herkamp

(57) ABSTRACT

A compressor casing includes an axially convex inner surface for surrounding a row of rotor blades with radial gaps therebetween. The tip of the blades complement the casing contour for reducing blade tip losses and flow blockage.

27 Claims, 4 Drawing Sheets

CONVEX COMPRESSOR CASING

BACKGROUND OF THE INVENTION

The present invention relates generally to gas turbine engines, and, more specifically, to compressors thereof.

A turbofan gas turbine engine includes a fan followed in turn by a multi-stage axial compressor each including a row of circumferentially spaced apart rotor blades, typically cooperating with stator vanes. The blades operate at rotational speeds which can result in subsonic through supersonic flow of the air, with corresponding shock therefrom. Shock introduces pressure losses and reduces efficiency.

Fan blades are the largest form of compressor blades whose radially outer tips experience the greatest relative velocity and are subject to strong passage and leading edge shock waves.

A stationary casing surrounds the rotor blades and includes a radially inwardly facing inner surface defining a shroud which forms a small radial tip clearance or gap with the rotor blades during operation. As the blades compress or pump airflow between the flow passages defined between adjacent blades, a differential pressure is created between the opposite pressure and suction sides of each blade. This differential pressure causes a portion of the pressurized air to flow through the tip gap and reduces pumping efficiency.

Furthermore, the airflow leaking over the blade tips typically rolls up into a vortex near the casing shroud which generates significant efficiency loss and aerodynamic flow blockage.

The flow pumping capacity of a compressor rotor stage is its ability to maximize airflow through the passages between adjacent blades. Pumping should be effected with maximum efficiency, and with a suitable stall or throttle margin. Airfoil leakage at the blade tips creates an aerodynamic flow blockage in those outer portions of the flow passages between adjacent tips which decreases pumping capacity and efficiency.

The presence of shock waves at the blade tips increases this problem. As the tip vortex passes through a shock wave, rapid diffusion of the air occurs with corresponding pressure losses and increase in aerodynamic flow blockage.

Accordingly, it is desired to provide an improved compressor casing and cooperating blade tips for reducing tip vortex related performance loss and flow blockage for improving pumping efficiency and throttle margin.

BRIEF SUMMARY OF THE INVENTION

A compressor casing includes an axially convex inner surface for surrounding a row of rotor blades with radial gaps therebetween. The tip of the blades complement the casing contour for reducing blade tip losses and flow blockage.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
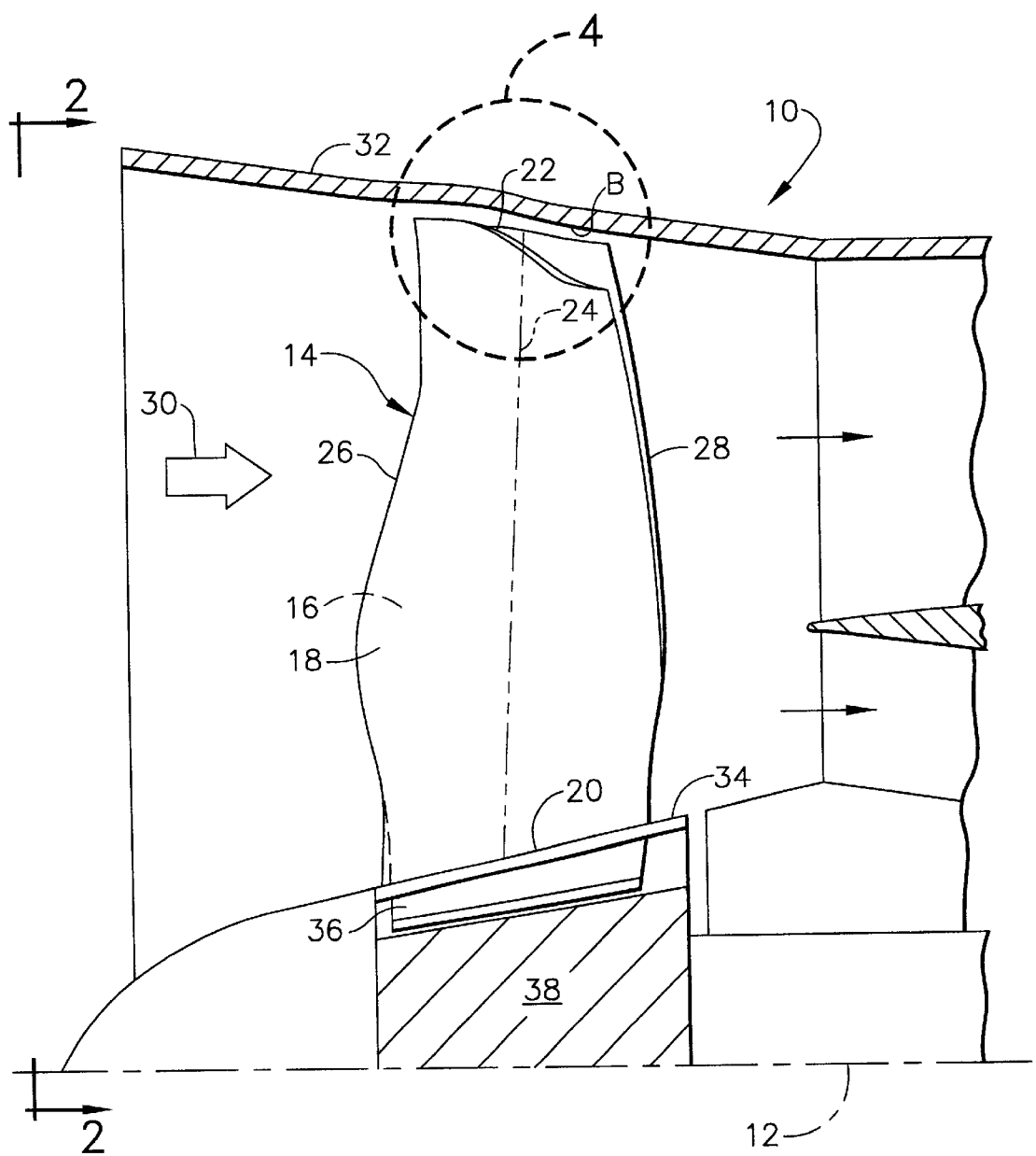
FIG. 1 is an axial, side elevational projection view of a row of fan blades inside a casing in accordance with an exemplary embodiment of the present invention.

Illustrated in FIG. 1 is a fan 10 of an exemplary turbofan gas turbine engine shown in part. The fan 10 is axisymmetrical about an axial centerline axis 12.

Figure 2:
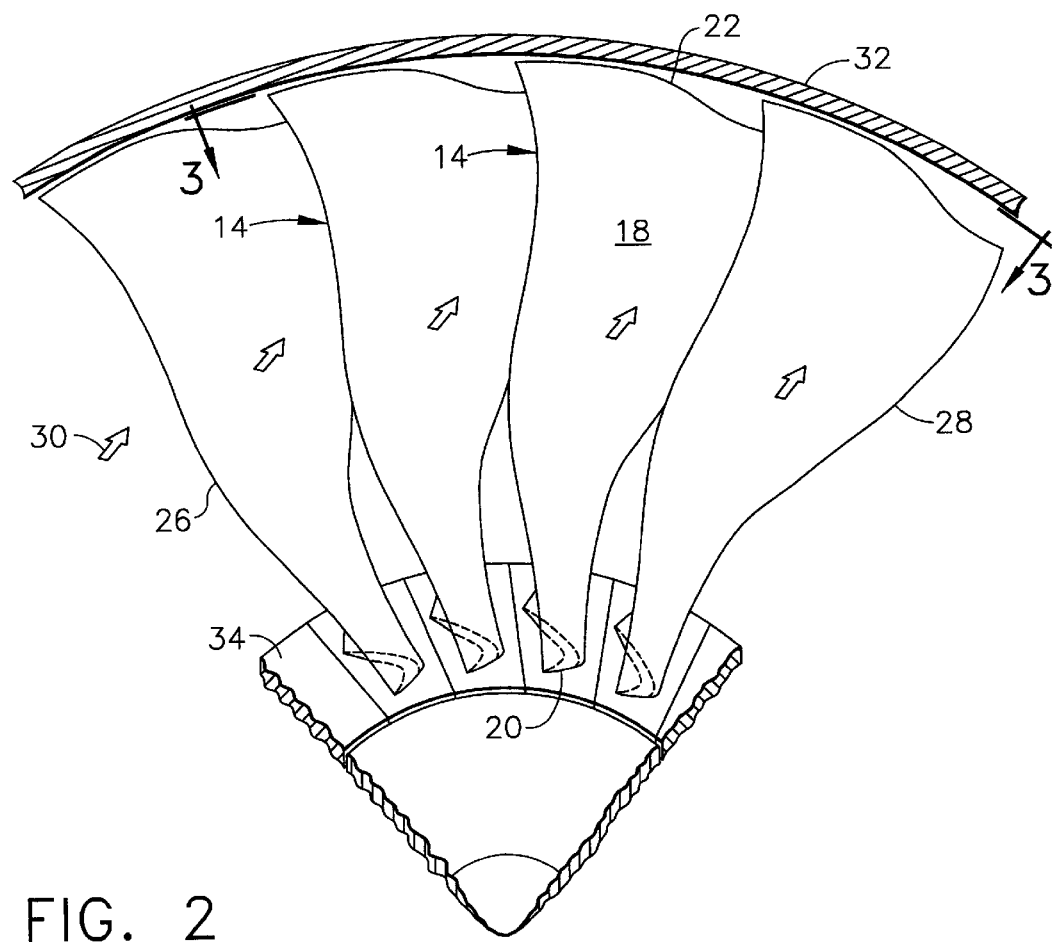
FIG. 2 is a forward-looking-aft radial view of a portion of the fan and casing illustrated in FIG. 1 and taken along line 2—2.
Figure 3:
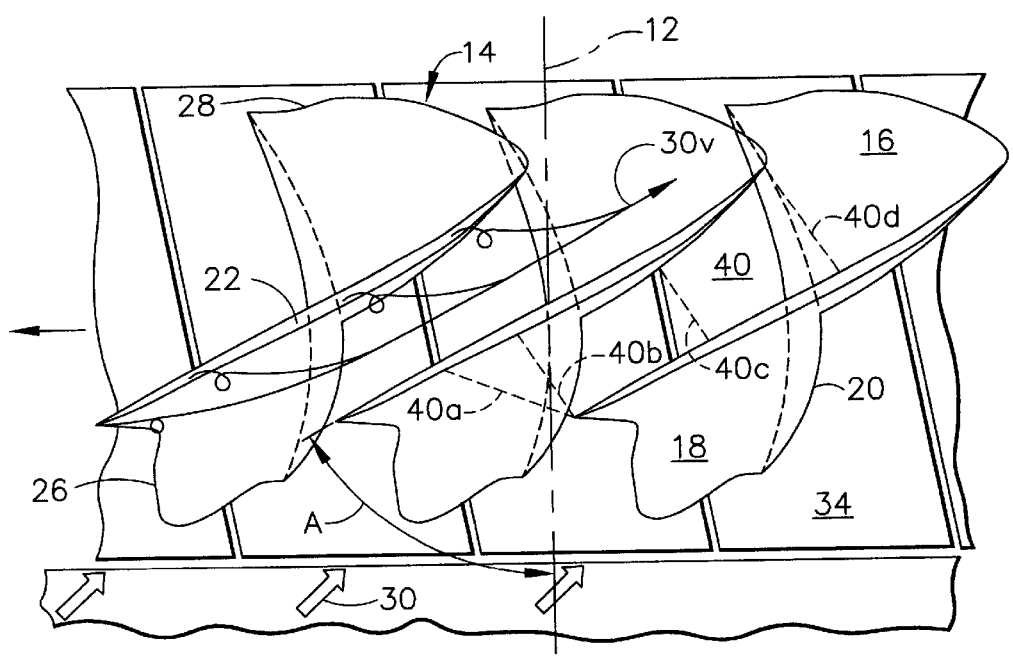
FIG. 3 is a top platform view of the fan blades illustrated in FIG. 2 and taken along line 3—3.

The fan includes a row of circumferentially spaced apart airfoils 14 in the exemplary form of fan rotor blades as illustrated in FIGS. 1–3. As initially shown in FIG. 3, each of the airfoils 14 includes a generally concave, pressure side 16 and a circumferentially opposite, generally convex, suction side 18 extending longitudinally or radially in span along transverse or radial sections from a radially inner root 20 to a radially outer tip 22.

As shown in FIG. 1, each airfoil 14 extends radially outwardly along a radial axis 24 along which the varying radial or transverse sections of the airfoil may be defined. Each airfoil also includes axially or chordally spaced apart leading and trailing edges 26,28 between which the pressure and suction sides extend axially.

As shown in FIG. 3, each radial or transverse section of the airfoil has a conventional straight chord between the leading and trailing edges, as well as an arcuate camber line therebetween. The airfoil twists from root to tip for cooperating with the air 30 channeled thereover during operation. The section chords vary in twist angle A from root to tip in a conventional manner.

The flowpath for the air channeled between the airfoils is bound radially outwardly by an annular fan or compressor casing 32 and radially inwardly by corresponding integral platforms 34 of each blade at which the roots 20 are located. A conventional dovetail 36 integrally joins each blade to a rotor disk 38 having complementary axial dovetail slots for radially retaining the blades thereto.

Referring again to FIG. 1, the fan blades 14 are illustrated inside an exemplary annular casing 32. The size and configuration of the blades are typically specified for obtaining a desired maximum amount of flow pumping capacity of the fan expressed in mass per second. The fan is initially designed for maximizing compression efficiency with an acceptable amount of stall or throttle margin.

The blade tips are typically sized and configured for providing a substantially uniform tip clearance or gap B with the casing 32 for minimizing airflow leakage therethrough during operation while preventing or reducing undesirable tip rubs against the casing. A conventional casing (not shown) is straight axially with either a cylindrical inner surface facing the blade tips, or with a conical converging, or diverging surface facing the tips.

In view of the substantial amount of blade twist typical in first stage fan blades, the blade tips extend in part circumferentially around the inner surface of the casing and must necessarily be radially outwardly bowed for achieving the desired uniform tip gap inside the cylindrical or conical casing.

The configurations of adjacent blades are typically designed for effecting a flow passage 40 having a converging-diverging form near the blade tips as shown in FIG. 3 for decelerating the airflow between the leading and trailing edges. The inboard form of the flow passage down to the blade roots diverges only. Diffusion occurs in the flow passage with static pressure rising as velocity decreases. The tip vortex acts as a blockage to limit the static pressure rise.

Figure 4:
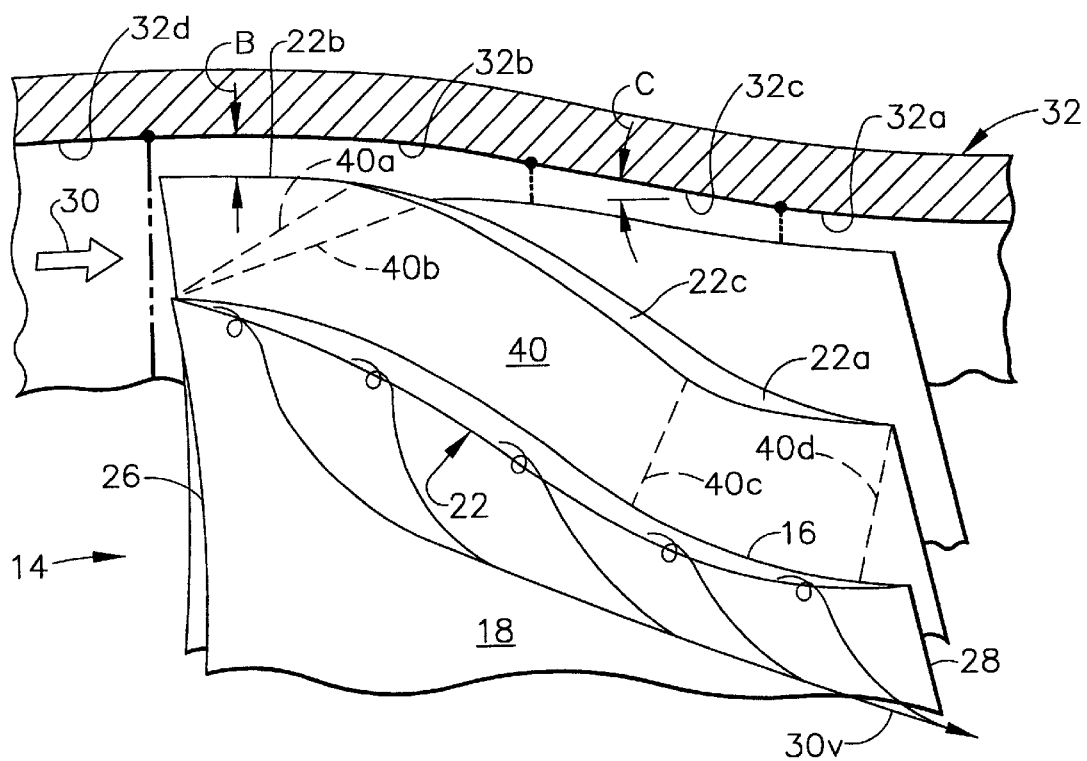
FIG. 4 is an enlarged axial side view of three circumferentially adjacent fan blade tips within the dashed circle labeled 4 of FIG. 1.

Since large fan blades can experience high Mach number flow at the tips thereof, the tip vortex 30v, as shown schematically in FIGS. 3 and 4, can interact with shock waves. The supersonic blade tip flow may create oblique shock waves emanating from the blade leading edges and a normal shock wave residing in the passage between adjacent blades. As indicated above, the pressure losses due to tip vortices are further increased by these forms of tip shock which decrease pumping capacity and compression efficiency.

In accordance with the present invention, the fan casing 32 illustrated in FIG. 1 has a specifically contoured radially inner surface defining a stationary shroud which is at least in part axially convex for surrounding the row of rotor blades 14 disposed coaxially therein, with the blade tips 22 being complementary with the contour of the casing for effecting a substantially uniform gap B therebetween.

As shown in exaggerated enlargement in FIG. 4, the inner surface of the casing 32 extends axially to surround the blades 14 from leading to trailing edge 26,28, and is axially convex at least along an aft portion thereof 32a to surround the blade tips at the trailing edges 28. Since the blade tips 22 complement the axial contour of the casing, each blade tip includes an aft part 22a which is radially inwardly concave at least in aft axial part from the trailing edge 28 toward the leading edge 26. In this way, the radially facing aft portions of the blade tips 22 and the casing inner surface complement each other with the former being radially inwardly concave and the latter being radially inwardly convex in the axial direction to effect the uniform gap B therebetween.

The axial contour of the casing inner surface illustrated in FIG. 4 is only one component of the complex three dimensional (3-D) configuration of the corresponding flow passages 40 defined between circumferentially adjacent blades 14. The radial sectional configurations of the blades from leading to trailing edge are conventionally defined for maximizing flow pumping capacity and compression efficiency with suitable stall margin. Each flow passage 40 includes a conventional induction area 40a as shown in FIGS. 3 and 4. The induction area extends from the pressure side at the leading edge of one blade to the suction side aft of the leading edge of the next adjacent blade and defines that area which encompasses the first covered pressure expansion wave during operation.

Immediately aft of the induction area 40a is the passage mouth 40b which extends from the pressure side at the leading edge of one blade generally perpendicularly to a corresponding portion on the suction side of the next adjacent blade aft from the leading edge and the induction area. The flow passage converges from its mouth to a throat 40c of minimum area suitably disposed generally aft of the midchord region of the blades from which the flow passage diverges to an outlet 40d having a larger discharge area, and defined between the suction side at the trailing edge of one blade generally perpendicularly to the pressure side of the next adjacent blade forward of the trailing edge thereof.

The converging-diverging contour of each flow passage 40 decelerates the airflow in turn for pressurizing the air as diffusion occurs in the axial direction as the air flows between the fan blades.

Figure 5:
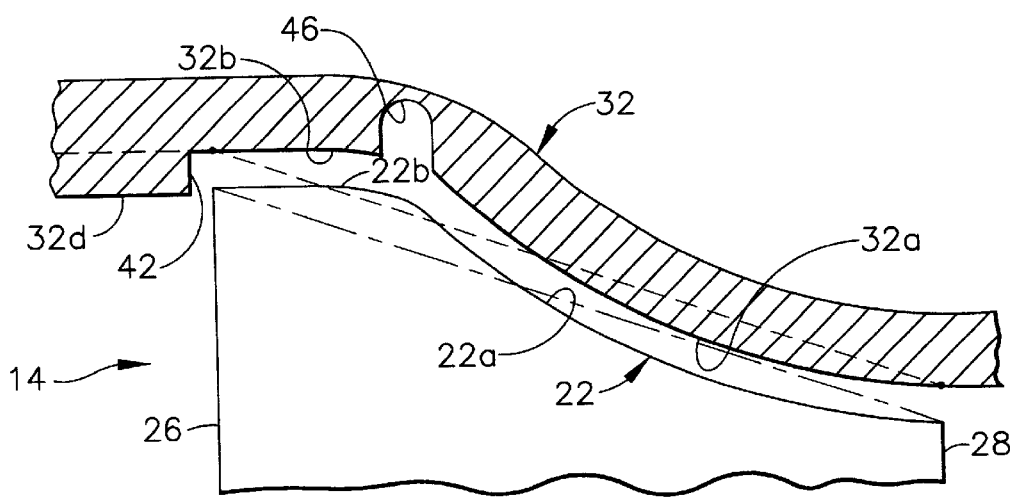
FIG. 5 is an enlarged axial side view of a blade tip and cooperating casing in accordance with another embodiment of the present invention.

The significance of the preferentially contoured casing 32 may be additionally appreciated upon examination of FIG. 5 in which the contours of the casing and complementary fan blade are exaggerated. Shown in dashed line inside the casing 32 is a conventional conical configuration thereof which cooperates with a straight, conical blade tip, shown in phantom line in axial profile, of a conventional fan blade. By forming the aft portion 32a of the casing inner surface axially convex upstream from the blade trailing edges, a local reduction in diffusion of the tip vortex generated during operation can be obtained.

Reducing diffusion of the tip vortex correspondingly reduces the pressure losses therefrom and the aerodynamic flow blockage for both increasing flow pumping capacity and compression efficiency within the constraints of a particularly sized fan. The outer diameters of the fan blades at their leading and trailing edges and the corresponding inner diameters of the opposing casing portions may remain the same as conventional values, but with an improved recontouring of the inner surface axially therebetween for locally enhancing aerodynamic performance.

The convex aft portion 32a of the casing inner surface may be effected in various manners including continuously arcuate, or segmented in conical portions as desired. From the aft portion, the casing may then be suitably contoured to return to a given inner diameter outboard of the blade edges.

More specifically, and referring to FIGS. 4 and 5, the casing inner surface further includes a forward portion 32b disposed axially upstream of the aft portion 32a for surrounding the blade tips at the leading edges 26 thereof. The casing forward portion 32b has a larger diameter about the fan centerline axis than the aft portion 32a, and thusly the casing converges therebetween.

For example, the casing inner surface preferably also includes an intermediate portion 32c disposed axially between the forward and aft portions 32b,a which converges therebetween in the aft direction.

The complementary blade tips 22 further include an axially forward part 22b and an intermediate or midchord part 22c axially aligned with corresponding portions of the casing. The respective parts of the blade tip vary in contour with the corresponding portions of the casing inner surface therearound between the leading and trailing edges of the blades to maintain a substantially uniform radial gap B therebetween. Since the casing intermediate portion 32c converges in a downstream direction, the intermediate part 22c of the blade tip also converges or slopes inwardly in profile in the axial direction between the forward and aft parts thereof.

The inner surface of the casing 32 is preferentially contoured to create an improved axial distribution of static pressure for locally reducing diffusion of the tip vortex to improve aerodynamic performance. Furthermore, the local reduction in diffusion additionally reduces the strength of normal shock for supersonic applications which in turn further reduces the degree of vortex diffusion across that shock. Since the tip vortex is subject to less severe static pressure rise gradient behind the shock, this tends to yet further reduce pressure losses, and reduce or prevent migration of the vortex toward the pressure side of the adjacent blade.

The reduction of normal shock strength and the lower vortex pressure loss and lower vortex flow blockage all contribute to a higher efficiency compressor rotor with improved pumping capability and increase throttle range. In one design analyzed using three dimensional viscous flow analysis on a transonic rotor at high specific flow, a casing contoured in accordance with an exemplary embodiment of the present invention resulted in a significant increase in total airflow and correspondingly higher rotor efficiency at the same rotational speed when compared with a conventional conical casing design.

In the exemplary embodiment illustrated in FIG. 4, the casing forward portion 32b over the blade leading edges has a larger outer diameter from the fan centerline axis than the casing aft portion 32a over the blade trailing edges. The contour of the casing inner surface is preferably selected for locally opening the induction area and throat of the flow passages, while the exit or discharge area of the flow passages remains the same for a given application. This also reduces effective camber at high speed of the fan for increasing total pumping flow with increased compression efficiency.

Since the outer diameters of the blade leading edges and trailing edges is preferably specified for a particular fan design, and in view of the improved axial contour of the forward and aft casing portions 32b,a, the casing intermediate portion 32c preferably converges greater than the forward and aft portions 32b,a for providing an aerodynamic transition between the different local effects around the leading and trailing edges of the blades.

As indicated above, the casing aft portion 32a over the blade trailing edges is axially convex and arcuate in the preferred embodiment. In alternate embodiments, the convex contour of the casing aft portion may include axially straight segments, such as one or more conical segments over the trailing edge region of the blades.

The casing intermediate portion 32c is preferably axially straight in the form of a conical section having a slope angle C, or cone half-angle, which is substantially greater than the corresponding slope angles of the forward and aft portions 32b,a. In this way, the forward and aft portions have limited slope or convergence, with a majority of slope and convergence occurring over the casing intermediate portion 32c corresponding to the midchord to aft portion of the blade tips being surrounded.

The casing forward portion 32b is preferably axially straight where it begins over the blade leading edges, either with a generally constant radius or inner diameter or slightly converging in the form of a conical section. The casing forward portion 32b preferably transitions to an axially arcuate form as it joins the casing intermediate portion 32c. In this way, the casing forward portion 32b is axially straight in its forward part over the leading edge, and is preferably axially concave in its aft part as it joins the preferably straight conical intermediate portion 32c. The casing aft portion 32a then follows in turn with axial convex contour for completing the hybrid axial contour of the casing surrounding the blade tips from the leading to trailing edges thereof.

As indicated above, the axial contour of the blade tips 22 as they extend radially outwardly toward the inner surface of the casing 32 are complementary to the respective portions thereof. Accordingly, the forward parts 22b of the blade tips transition in axial side view from straight to axially convex for matching the complementary axial contour of the casing forward portion 32b which transitions from straight to axially concave. The intermediate parts 22c of the blade tips are axially conical to complement the axially conical casing intermediate portion 32c. And, the aft parts 22a of the blade tips are axially concave to complement the axially convex casing aft portion 32a.

In this way, the axial contour of the inner surface of the casing 32 where it surrounds the blade tips from leading to trailing edges varies for effecting a favorable axial distribution of static pressure for reducing local diffusion of tip vortices, and the strength of normal shock during supersonic operation, in addition to the benefits previously described above.

As shown in FIG. 4, the inner surface of the casing 32 further includes an annular inlet portion 32d extending upstream from the forward portion 32b outboard of the blade leading edges 26. The inlet portion 32d may be cylindrical, conically divergent, or conically convergent, and is coaxial with the other casing portions for channeling the airflow 30 thereto. In FIG. 4, the inlet portion 32d is preferably axially divergent, and smoothly blends with the shroud forward portion 32b for maximizing the induction area 40a.

In the FIG. 5 embodiment, the inlet portion 32d has a reduced inner diameter and coaxially joins the casing forward portion 32b at a radially outwardly extending step 42 which effectively positions the casing inner surface surrounding the blade tips in a recessed trench defining a shroud around the blade tips. Shroud trenching is conventional, but may be used with the preferentially axially contoured casing inner surface in accordance with the present invention for improving performance of the fan.

Figure 6:
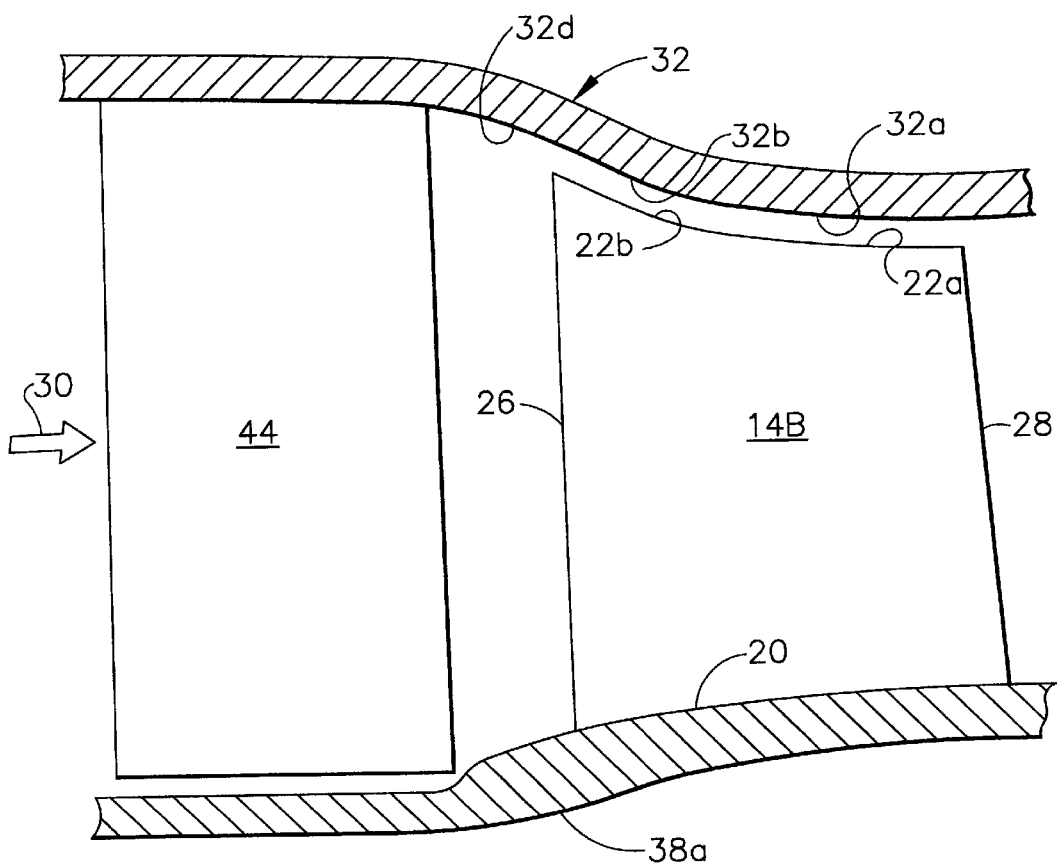
FIG. 6 is an axial, side elevational projection view of a row of compressor blades following a row of stator vanes in accordance with another embodiment of the present invention.

The embodiment illustrated in FIGS. 1–5 is representative of a relatively long fan blade whose outer portion pressurizes air for discharge from a turbofan engine to produce propulsion thrust. The invention, however, is also applicable to other types of compressor airfoils such as the axial compressor blade 14B illustrated schematically in FIG. 6.

The compressor blade 14B extends radially outwardly from a supporting disk or drum 38a in one of several axial rotor and stator stages of a compressor in a conventional manner. Disposed upstream from the row of compressor blades is a corresponding row of stator vanes 44 which guide the airflow 30 to the compressor blades.

The airflow is channeled axially from vane to blade of the several stages, and is bound radially outwardly and inwardly by the flowpath endwalls. The casing defines the outer wall, and the drum defines the inner wall between which the vane and blade airfoils extend. The vanes are spaced from the inner wall to define a radial gap therebetween, like the blade tip gap, to permit relative rotational movement.

In this embodiment, the casing inner surface includes axially adjoining aft and forward portions 32a,b surrounding the compressor blades 14B. The entire casing inner surface between the leading and trailing edges of the blades is axially convex in this embodiment for again locally reducing diffusion of the tip vortices for enhancing air pumping capacity by reducing flow blockage and pressure losses.

In this embodiment, the annular inlet portion 32d of the casing coaxially joins the casing forward portion 32b upstream therefrom and preferably converges in the downstream direction either in conical section, or axially concave as illustrated in the preferred embodiment.

The tips of the compressor blades 14B have complementary contours for matching the convex axial contour of the casing inner surface to provide a substantially uniform radial gap therebetween. Accordingly, the adjoining aft and forward parts 22a,b of the blade tips are axially concave to complement the axially convex contour of the surrounding casing inner surface.

Compressor performance may be additionally improved by introducing circumferential slots or grooves in the casing.

In conventional practice, such grooves can enhance rotor throttle margin, but this usually results in poorer rotor efficiency.

However, such grooves in combination with the convex casing contour described above provide additional benefit not otherwise possible. For example, FIG. 4 additionally illustrates a single circumferential groove 46 disposed in the forward portion of the casing 32, which groove is open toward the blade tip 22 inboard therefrom. The casing groove and convex contour complement each other to maximize performance and stability improvements.

The casing groove acts to enhance stability and to allow more aggressive convex contouring than would otherwise be possible. The discontinuity introduced by the groove 46 allows the induction and throat areas to be maximized while also allowing higher convex casing curvatures 32a downstream. Without the groove, the casing flowpath could otherwise have a higher concave curvature in its place which could degrade performance and stability.

The performance penalty usually associated with casing grooves is avoided by the use of fewer grooves, preferably a single groove, and by the more favorable tip static pressure distribution imposed by the casing contour.

In the embodiments disclosed above, improved pumping capacity and efficiency may be obtained. Since the embodiment illustrated in FIG. 6 includes the axially convex casing inner surface only, it does not realize all the advantages described above for the first embodiment.

However, the different embodiments disclosed above permit minimal changes in casing and blade tip geometry for obtaining enhanced performance of compressor and fan blades without otherwise changing the overall size of the fan or compressor stages. For given design specifications, the axially contoured casings and complementary blade tips permit substantial improvements in performance not otherwise possible. These new features may be incorporated into existing designs where feasible for enhancing performance of fans and compressors, either subsonically or supersonically.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured Letters Patent of the United States is the invention as defined and differentiated in the following claims in which we claim:

1. A compressor casing comprising an inner surface extending axially for surrounding a row of rotor blades from leading to trailing edges thereof with radial gaps between tips of said blades and said inner surface, and said inner surface including:
   an axially convex aft portion for surrounding said blade tips at said trailing edges;
   a larger diameter forward portion disposed upstream of said aft portion for surrounding said blade tips at said leading edges; and
   said forward portion converges axially aft for surrounding mouths of passages between said blades, with each of said mouths extending axially from a pressure side at a leading edge of one of said blades generally perpendicularly to a corresponding portion on a suction side of a next adjacent blade aft from the leading edge thereof.

2. A casing according to claim 1 wherein said inner surface is axially convex and converges along both said aft and forward portions.

3. A casing according to claim 2 further comprising a diverging inlet coaxially joining said forward portion.

4. A casing according to claim 3 wherein said inlet is axially concave.

5. A casing according to claim 2 in combination with said row of blades disposed coaxially therein in axial alignment with said casing, and said blade tips being complementary with said casing aft and forward portions for effecting substantially uniform gaps therebetween.

6. A casing according to claim 1 wherein said inner surface further includes an intermediate portion disposed between said forward and aft portions and converging therebetween.

7. A casing according to claim 6 wherein said casing intermediate portion converges greater than said forward and aft portions.

8. A casing according to claim 7 wherein said casing aft portion is axially arcuate.

9. A casing according to claim 7 wherein said casing intermediate portion is axially straight.

10. A casing according to claim 7 wherein said casing forward portion is axially straight.

11. A casing according to claim 7 wherein said casing forward portion is axially arcuate.

12. A casing according to claim 7 wherein said casing forward portion is in forward part axially straight and in aft part axially concave.

13. A casing according to claim 7 wherein said casing forward portion is axially concave, said casing intermediate portion is conical, and said casing aft portion is axially convex.

14. A casing according to claim 13 further comprising an inlet coaxially joining said casing forward portion at a radially outwardly extending step.

15. A casing according to claim 13 in combination with said row of blades disposed coaxially therein in axial alignment with said casing, and said blade tips being complementary with said aft, intermediate, and forward portions for effecting substantially uniform gaps therebetween.

16. A casing according to claim 7 in combination with said row of blades disposed coaxially therein in axial alignment with said casing, and said blade tips being complementary with said aft, intermediate, and forward portions for effecting substantially uniform gaps therebetween.

17. A casing according to claim 1 in combination with said row of blades disposed coaxially therein in axial alignment with said casing, and said blades further include radially outer tips being complementary with said casing for effecting substantially uniform gaps therebetween.

18. A compressor casing comprising an inner surface extending axially for surrounding a row of rotor blades between leading and trailing edges thereof, with corresponding radial gaps between said casing and tips of said blades, and said inner surface includes a forward portion of larger diameter than an aft portion, with said aft portion being axially convex, and with said forward portion converging axially for surrounding mouths of passages extending generally perpendicularly between adjacent ones of said blades at leading edges thereof.

19. A casing according to claim 18 wherein said inner surface further includes an intermediate portion disposed between said forward and aft portions and converging therebetween.

20. A casing according to claim 19 wherein said casing forward portion is axially concave, said casing intermediate portion is conical, and said casing aft portion is axially convex.

21. A compressor rotor blade for being mounted radially outwardly from a rotor disk inside a surrounding casing, and comprising:

pressure and suction sides extending in span from root to tip and in chord between leading and trailing edges, and having twist therebetween;

said blade tip being radially inwardly concave between said leading and trailing edges at least in aft axial part at said trailing edge to define a substantially uniform gap with an axially convex inner surface of said casing; and said blade tip being axially converging from said leading edge to a mouth of a passage with an adjacent blade extending generally perpendicularly to said blade suction side at a leading edge of said adjacent blade.

22. A blade according to claim 21 further comprising axially forward and intermediate parts varying in contour with said aft part thereof between said leading and trailing edges to complement respective axially forward, intermediate, and aft portions of said casing inner surface, and wherein said tip intermediate part converges radially inwardly between said forward and aft parts thereof.

23. A blade according to claim 22 wherein said blade tip contour varies from an axially convex forward part, conical intermediate part, and axially concave aft part to complement an axially concave casing forward portion, a conical casing intermediate portion, and an axially convex casing aft portion.

24. A compressor comprising:

a row of rotor blades extending radially outwardly from a rotor disk inside a surrounding casing;

each of said blades including pressure and suction sides extending in span from root to tip and in chord between leading and trailing edges, and having twist therebetween;

adjacent blades defining a flow passage therebetween having a mouth extending generally perpendicularly from the suction side of one blade aft from the leading edge thereof to the leading edge of the next blade;

said casing including an inner surface with a forward portion surrounding said blade leading edges, and an aft portion surrounding said blade trailing edges; and said forward portion surrounds said passage mouth and converges axially aft thereover; and said aft portion is axially convex and converges axially aft from said forward portion.

25. A compressor according to claim 24 wherein said flow passage converges from said mouth to a throat of minimum area disposed aft of a midchord of said blades, and then diverges to a larger outlet defined in part at said blade trailing edges, and said casing inner surface further includes a converging intermediate portion disposed axially between said forward and aft portions.

26. A compressor according to claim 25 wherein said casing intermediate portion converges greater than said forward and aft portions.

27. A compressor according to claim 26 wherein said blade tips include forward, intermediate, and aft parts being complementary with said forward, intermediate, and aft portions of said casing inner surface to effect substantially uniform gaps therewith, and said forward portion is axially concave, and said intermediate portion is conical.

* * * * *